P. DUNWALD.
Churn.
No. 31,447.
Patented Feb. 19, 1861.
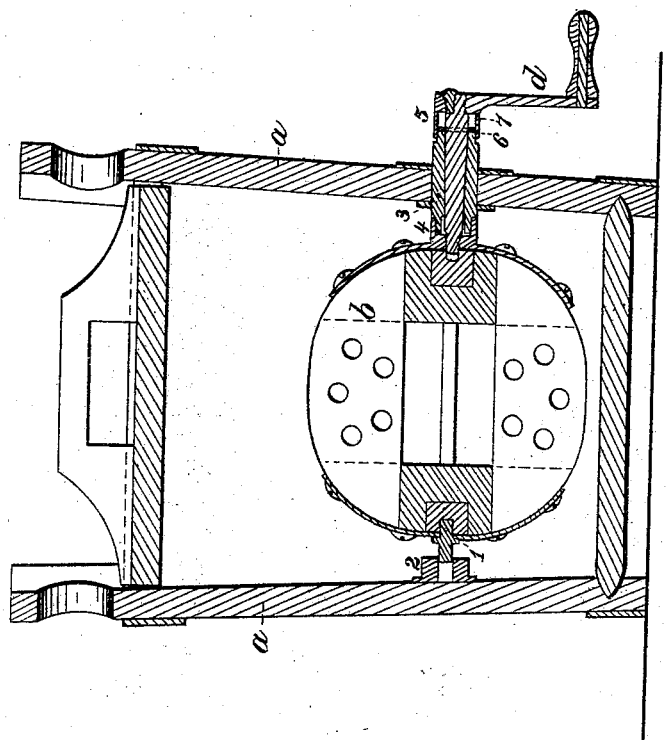
Witnesses.
Lewis Webb
Theodore Visser
Joseph Kiebler
Inventor:
Peter Dunwald

UNITED STATES PATENT OFFICE.

PETER DUNWALD, OF CORNING, NEW YORK.

CHURN.

Specification of Letters Patent No. 31,447, dated February 19, 1861.

*To all whom it may concern:*

Be it known that I, PETER DUNWALD, of Corning, in the county of Steuben and State of New York, have invented, made, and applied to use a certain new and useful Improvement in Churns; and I do hereby declare that the following is a full, clear, and exact description of the construction of said churn, reference being had to the annexed drawing, making part of this specification, wherein I have represented a vertical section of my said churn.

Several churns have heretofore been made with revolving dashers on horizontal shafts. My invention relates only to a peculiar construction of shaft or axis that is formed so as to be perfectly tight while in use, but allow for the removal of the dasher with great facility when necessary for cleaning the churn.

In the drawing $a$, is the body of the churn of any desired shape or material.

$b$, is the dasher perforated as usual, $d$, is the handle or crank by which the dasher is revolved.

1 is a center at one side of the dasher taking the eye 2, attached to the inside of the churn.

3, is a hollow or pipe journal box passing through the side of the churn $a$, and passing the axis or shaft $c$, that is screwed into a metallic nut or socket 4, attached to the dasher $b$. The inner end of the pipe 3, sets into a circular recess in the said socket 4, as shown, and the outer end of the pipe 3, enters a small cylinder 5, formed on the handle $d$, around the axis $c$. In the space between the said cylinder 5 and the axis $c$, I introduce a washer 6, and an india rubber washer or spring 7 that keeps the washer 6, up to the end of the pipe 3. The axis $c$, is formed slightly smaller at the part occupied by the washer 6, and this end of the axis $c$, is attached to the handle $d$ as represented. By this construction the act of screwing the axis $c$, into the part 4 draws the dasher tight against the inner end of the pipe 3, and the washer 6, sets with the spring pressure against the other end, keeping the axis water or milk tight. By unscrewing the axis $c$, the dasher can be removed when required.

What I claim as my invention and desire to secure by Letters Patent is—

The axis $c$, provided with the washer 6, kept to the end of the pipe 3, by a spring 7, said axis $c$, screwing into the socket 4, on the dasher $b$, as and for the purposes set forth.

In witness whereof I have hereunto set my signature this twenty first day of November 1860.

PETER DUNWALD.

Witnesses:
 THEODORE VISSER,
 Z. LEWIS WEBB,
 JOSEPH KÜBLER.